Oct. 27, 1970    J. P. MONTGOMERY ET AL    3,535,816
ANIMAL TRAP
Filed Sept. 17, 1968    2 Sheets-Sheet 1
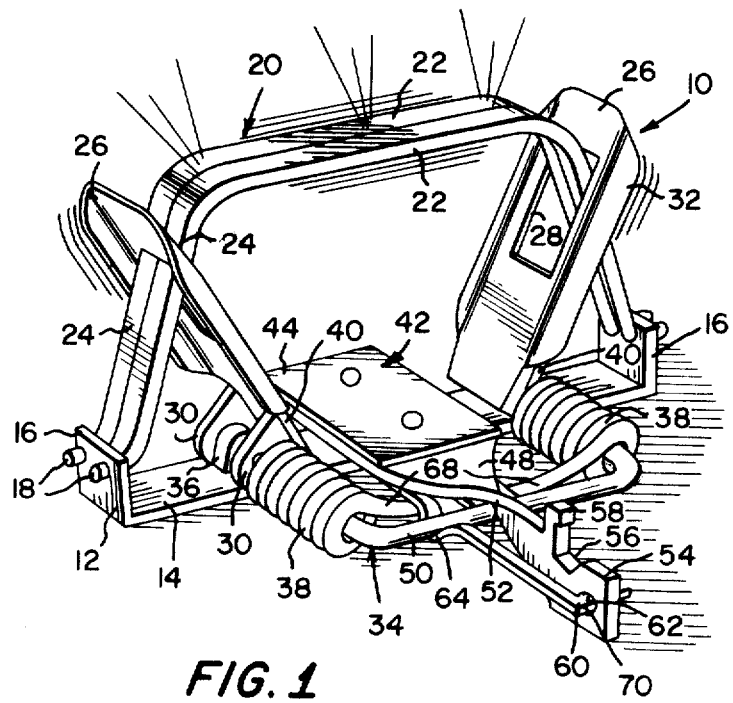
FIG. 1
FIG. 5
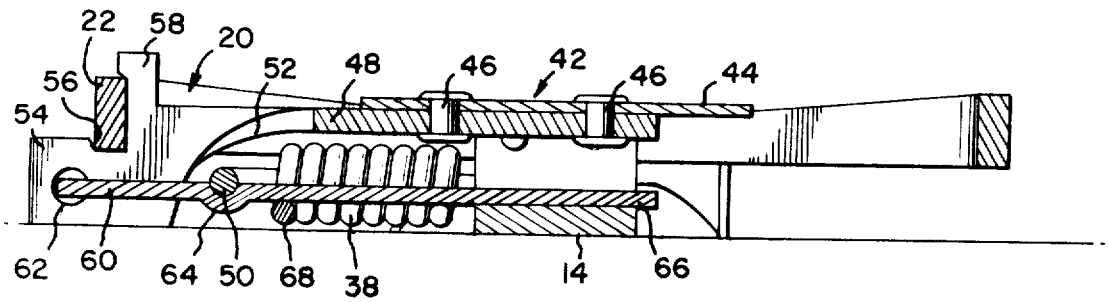
FIG. 6
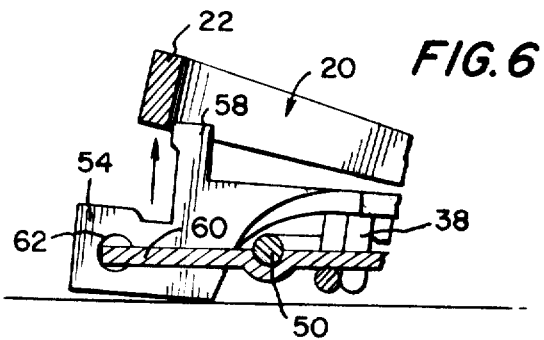
INVENTORS
JAMES P. MONTGOMERY
HERMAN MONTGOMERY
BY Berman, Davidson & Berman
ATTORNEYS

INVENTORS
JAMES P. MONTGOMERY
HERMAN MONTGOMERY

United States Patent Office 3,535,816
Patented Oct. 27, 1970

3,535,816
ANIMAL TRAP
James P. Montgomery, Rossiter, Pa. (R.D. 2, Mahaffey, Pa. 15757), and Herman Montgomery, 317 Pine St., Curwensville, Pa. 16833
Filed Sept. 17, 1968, Ser. No. 760,271
Int. Cl. A01m 23/26
U.S. Cl. 43—93               3 Claims

ABSTRACT OF THE DISCLOSURE

A pair of trap jaws with spring fulcrum means adapted to snap the jaws together and spring lever means operatively connected to the spring fulcrum means for movement by the spring fulcrum means, and catch lug means for holding the trap jaws in an unsprung position with trip plate means operatively connected to the catch lug means for releasing the catch lug means so the trap jaws can snap together.

---

The present invention relates to an animal trap and more particularly to an animal trap for catching small animals such as foxes and the like, although the trap can be used to catch larger animals as desired.

It is an object of the present invention to provide a simple and yet sturdy animal trap that can be inexpensively made and which can be set by a relatively unskilled person.

Another object of the present invention is to provide an animal trap with a pair of jaws operatively connected to spring lever means for snapping the jaws together in a vertical position and from a horizontal position, and with latch means having a lug thereon for maintaining the jaws in a horizontal position until a tripping plate is contacted by the animal.

Another object of the present invention is to provide an animal trap having a catch lug that is adapted to hold one of the jaws in a relatively flat horizontal position until the lug or catch means is tilted or pivoted by an animal contacting the tripping plate so as to release the trap jaw which in turn will permit the spring lever means to be forced upwardly by spring means so that the spring lever means will cause the trap jaw means to be snapped together in a vertical plane.

Various other objects and advantages of the present invention will be readily apparent from the following detailed description when considered in connection with the accompanying drawings forming a part thereof, and in which:

FIG. 1 is a perspective view of the animal trap device embodied in the present invention shown in a released position;

FIG. 5 is an enlarged detailed sectional view taken along the lines 5—5 of FIG. 2; and FIG. 6 is an enlarged fragmentary view similar to FIG. 5 but illustrating the trap jaw being released after the lug catch means has been tripped.

Figure 2:
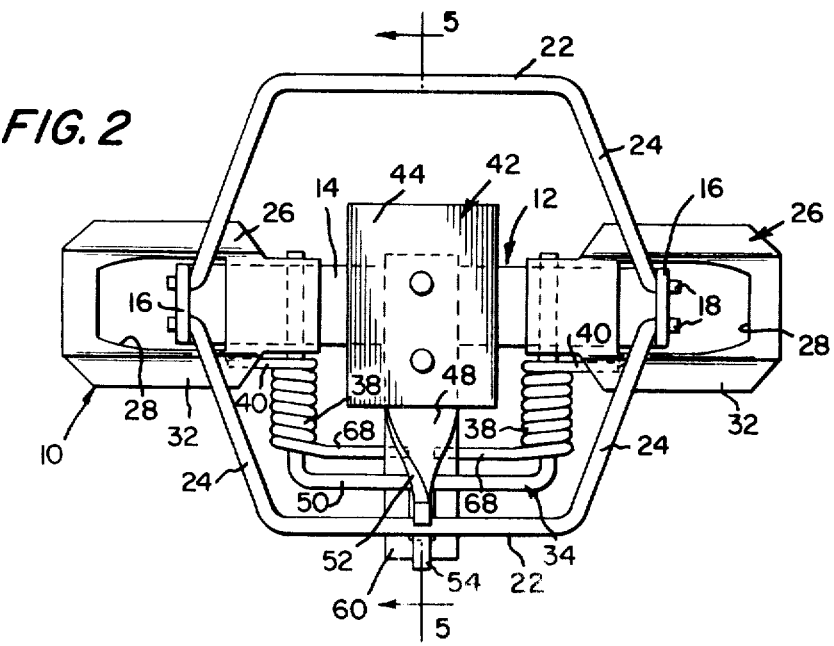
FIG. 2 is a top plan view of the animal trap device of the present invention.
Figure 3:
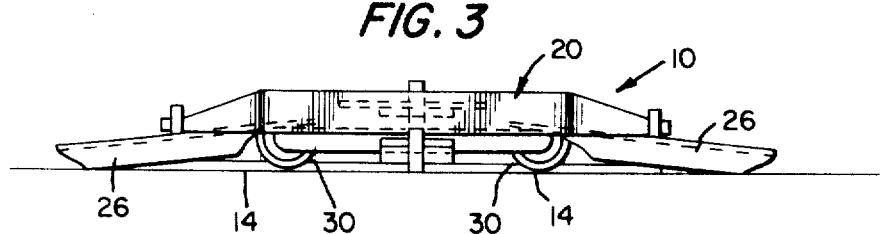
FIG. 3 is a side view of the trap when it is in a set position, and before release, similar to the set position shown in FIG. 2.
Figure 4:
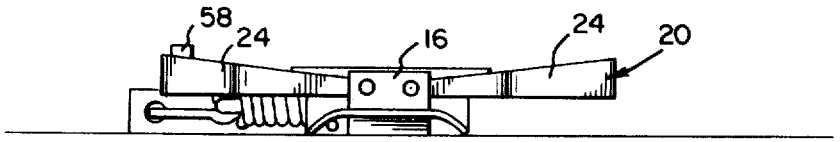
FIG. 4 is an end view of the trap when in a set position, and is a view of the trap shown in FIG. 2 looking at it from the left side.

Referring to the drawings, the reference numeral 10 generally designates the animal trap embodying the present invention. The trap is provided with a trap standard 12 as best seen in FIG. 1, which comprises a substantially flat or horizontal strap 14 with upturned portions 16 adjacent the opposite ends thereof. The upturned ends or portions 16 are provided with two laterally spaced apertures or openings therein through which extend the circular ends or rods 18 of the trap jaws 20. The trap jaws 20 are substantially rectangular in cross-section between the end rods 18 thereof and the end rods 18 are disposed in the apertures in the upturned portions 16 so that they can pivot from a horizontal position, as shown in FIG. 2, to an upright or vertical position as shown in FIG. 1. The trap jaws 20 are substantially U-shaped in configuration and have a central portion 22 and end portions or leg portions 24 which form the legs of the U, as best seen in FIGS. 1 and 2.

The device is provided with spring lever members 26 disposed on the standard 12. The spring lever members comprise a substantially rectangular configuration with a rectangular opening 28 therein adjacent one end thereof, and the spring lever members 26 are provided with lugs 30 adjacent their inner ends thereof secured to the strap 14 of the standard 12. The spring lever members are disposed on the strap 14 facing in opposite directions, as best seen in FIGS. 1 and 2, and the openings 28 have the trap jaws 20 extending therethrough. The outer edges 32 along the opposite sides of the spring lever members 26 are turned or bent downwardly. The inner ends of the spring lever members 26 are pivotally connected or disposed on a rod 34 which is a U-shaped configuration and is secured to lugs 36 on the strap 14. The rod 34 passes through openings in the lugs 30 on the spring members 26.

A pair of springs 38 are disposed on the legs of the U-shaped rod 34 and have one leg 40 disposed beneath the turned down outer edges 32 of the spring lever members so as to normally urge the spring lever members toward a vertical position or toward the position shown in FIG. 1.

The device is provided with a tripping plate 42 which has a central rectangular portion 44 extending across the top of the strap 14, as best seen in FIGS. 1 and 2.

The central portion 44 is riveted by rivets 46 to a section 48 of the plate that extends outwardly of the strap 14 and over and below the bight 50 of the U-shaped rod 34. The section 48 has a reverse bend 52 therein and terminates in a vertical section 54 adjacent the outer end of the bend 52. The vertical section 54 is provided with a notch or cut-out 56 therein and has an upstanding catch 58 disposed adjacent one side of the recess or cut-out portion 56.

The tripping plate is further provided with a bifurcated section 60 adjacent the sections 48 and 54. The bifurcated section 60 is threaded through an opening 62 in the section 54 and the bifurcated section is further provided with two detents or recesses 64 therein, which receive the bight 50 of the rod 34. The bight 50 of the rod 34 extends beyond and below the bend 52 and above the bifurcated section 60 by virtue of being disposed in the detents 64 of the bifurcated section.

The bifurcated section 60 has its inner end 66 disposed on the upper surface of the strap 14, as best seen in FIG. 5. The springs 38 have horizontally extending legs 68 which are disposed inwardly of the detents 64 and below the bifurcated section 60, as best seen in FIG. 5. The opening 62 is of sufficient size so that the section 54 can pivot about the connecting portion 70 of the bifurcated section 60.

When the trap is in a set position, as shown in FIGS. 2 and 5, the central portion or bight 22 of one of the trap jaws 20 is disposed in the recess 56 of the section 54, as best seen in FIG. 5. At this time, the catch 58 of the tripping plate member prevents the spring lever members 26 from being released to a vertical position by virtue of the catch 58 holding the trap jaw in a locked position.

When an animal makes contact with the central rectangular portion 44 of the tripping plate member, the portion 44 will be depressed so that the catch 58 pivots backwardly, as best seen in FIG. 6, so that the central portion 22 of the trap jaw is released. The spring members 38 therefore cause the spring lever members to move upwardly as best seen in FIG. 1.

Since the trap jaws 20 are threaded through the openings 28 in the spring lever members 26, the movement of the lever members 26 in an upward direction will cause the trap jaws 20 to be snapped together from a horizontal position to a vertical position thus trapping the animal in the device.

From the foregoing description, it is apparent that the present invention provides a novel and simple animal trap which has a sturdy construction and which has novel tripping plate means and latching means which maintains one of the trap jaws in a horizontal position until the animal trips the latch means and the spring means of the device cause the spring lever members to move upwardly to snap the trap jaws together.

Inasmuch as various changes may be made in the relative form and location of the parts without departing from the invention, it is not meant to limit the scope of the invention except by the appended claims.

What is claimed is:

1. An animal trap device comprising a U-shape strap member, a pair of U-shape trap jaw members pivotally connected at their opposite ends to the legs of said strap member to move toward each other when moved to a vertical position, spaced lug members disposed on said strap member, a U-shaped horizontal rod having its legs extending through said lug members, a pair of spring lever members with a substantially rectangular opening therein and having lugs thereon secured to said legs of the horizontal rod, the legs of said jaw members extending through said openings, said lever members being pivotally connected on said rod to move to a vertical position in a direction perpendicular to said jaw members to raise said jaw members to a vertical position to clamp them together, a freely floating trip plate disposed over the bight of said strap member, said plate having a central rectangular portion and a portion twisted from a horizontal plane to a vertical plane, the latter portion extending outwardly of the strap member and over the bight of said rod, a bifurcated member providing an elongated slot extending in the same direction as said twisted portion and passing beneath said rod with detents therein receiving said rod bight, the twisted portion in the vertical plane having a recess therein with an overhanging latch for receiving the bight of a U-shaped jaw member therein, said bifurcated member having end portions forming a cross bar extending through an opening in the outer end of said twisted portion to form a free pivot with a portion of said twisted portion guidingly received in said elongated slot, spring members on the legs of said rod normally urging said lever members toward a vertical position.

2. The device of claim 1 wherein said lever members are provided with a depressed longitudinal portion and turned down edges.

3. The device of claim 2 wherein said jaw members are substantially rectangular in cross-section.

References Cited

UNITED STATES PATENTS

| 956,624 | 5/1910 | Brock | 43—93 |
| 2,216,911 | 10/1940 | Hannold | 43—92 |
| 2,489,095 | 11/1949 | Lienhard | 43—92 |

FOREIGN PATENTS

| 20,256 | 6/1930 | Australia. | |

WARNER H. CAMP, Primary Examiner